US006326982B1

(12) United States Patent
Wu et al.

(10) Patent No.: US 6,326,982 B1
(45) Date of Patent: Dec. 4, 2001

(54) METHOD AND APPARATUS FOR AUTOMATICALLY ACCESSING WEB PAGES BASED ON TELEVISION PROGRAMMING INFORMATION

(75) Inventors: Bo Wu, San Jose; Guohong Xu, Santa Clara, both of CA (US)

(73) Assignee: Enreach Technology, Inc., Santa Clara, CA (US)

(*) Notice: Subject to any disclaimer, the term of this patent is extended or adjusted under 35 U.S.C. 154(b) by 0 days.

(21) Appl. No.: 09/344,160

(22) Filed: Jun. 24, 1999

(51) Int. Cl.[7] .................................................. G06F 3/14
(52) U.S. Cl. ...................... 345/718; 725/112; 725/109; 725/110; 348/552; 348/563; 348/564; 348/473; 348/906; 345/738; 345/717; 345/733
(58) Field of Search ..................................... 345/348, 357, 345/339, 327, 329, 333; 348/13, 552, 563, 564, 473, 906; 709/501, 513; 725/112, 109, 110

(56) References Cited

U.S. PATENT DOCUMENTS

| 5,101,499 | 3/1992 | Streck et al. ........................ 455/4.1 |
| 5,589,892 | 12/1996 | Knee et al. ........................ 348/731 |
| 5,673,089 | 9/1997 | Yuen et al. ........................ 348/734 |
| 5,778,181 | 7/1998 | Hidary et al. ................... 395/200.48 |
| 5,818,935 | 10/1998 | Maa ..................................... 380/20 |
| 5,828,839 | 10/1998 | Moncreiff ............................ 709/204 |
| 5,844,552 | 12/1998 | Gaughan et al. .................... 345/327 |
| 5,850,218 | 12/1998 | LaJoie et al. ....................... 345/327 |
| 5,895,462 | 4/1999 | Toki ....................................... 707/3 |
| 5,905,865 | 5/1999 | Palmer et al. ................... 395/200.47 |
| 5,946,048 | 8/1999 | Levan ................................. 348/473 |
| 6,008,777 | 12/1999 | Yiu ......................................... 345/2 |
| 6,052,122 | 4/2000 | Sutcliffe et al. .................... 345/331 |
| 6,073,171 | 6/2000 | Gaughan et al. .................... 709/219 |

FOREIGN PATENT DOCUMENTS

| 0852361 A1 | 1/1998 | (EP) . |
| WO 98/56188 | 12/1998 | (WO) . |
| 99/04561 | 1/1999 | (WO) . |

Primary Examiner—Raymond J. Bayerl
Assistant Examiner—Thomas T. Nguyen
(74) Attorney, Agent, or Firm—Justin Boyce; Tamiz Khan; Oppenheimer Wolff & Donnelly LLP

(57) ABSTRACT

A client system and a dedicated server are provided, the client system having an internet module providing communication with the server, a television tuner operative to receive a plurality of video channels carrying video data, and a video processing unit operative to provide a video output signal for displaying images on a television. A process is provided for accessing Web pages associated with corresponding portions of the video data, the process including the steps of: determining a selected channel parameter indicative of a selected one of the video channels received by the television tuner of the client system; determining a particular time parameter indicative of a particular time at the client site, the selected channel parameter and the particular time parameter being associated with a particular portion of video data to be transmitted to the client system via the selected video channel at the particular time; and determining a matching Web address associated with the particular portion of video data, the matching Web address being determined by comparing the particular time parameter and the selected channel parameter to electronic program schedule information including a plurality of program schedule segments each including a corresponding time frame parameter indicative of an associated time frame, and a corresponding channel parameter indicative of an associated one of the video channels, each of the program schedule segments being associated with a corresponding portion of video data to be received by the client system via the associated channel during the associated time frame.

33 Claims, 6 Drawing Sheets

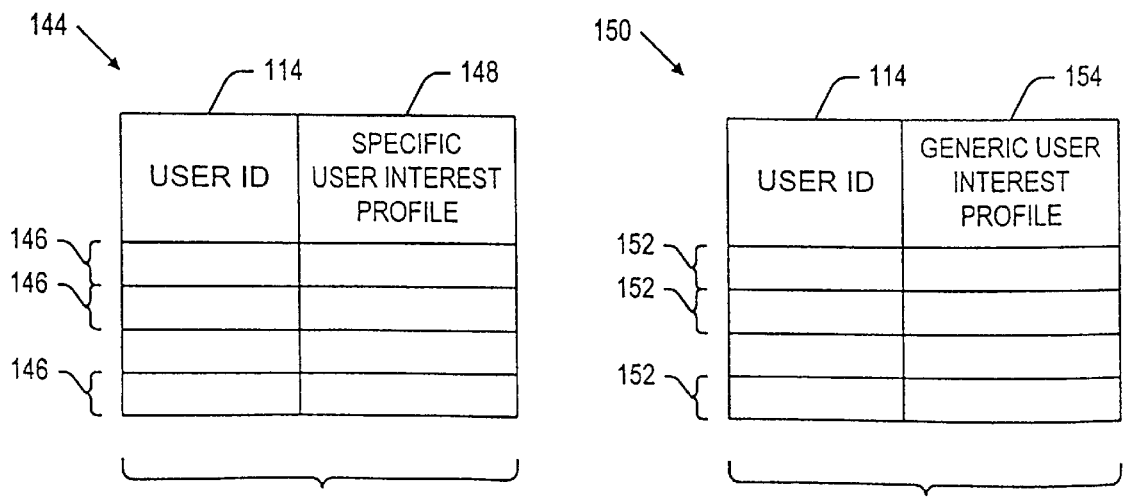

| 160 ↗ | | | | | | |
|---|---|---|---|---|---|---|
| CHANNEL CONTENT ID ⌐134 | SPECIFIC USER INTEREST PROFILE ⌐148 | USER URL INFO_1 ⌐162 | USER URL LAYOUT_1 ⌐164 | USER URL INFO_2 ⌐166 | USER URL LAYOUT_2 ⌐168 | ⋮ |
| | | | | | | |
| | | | | | | |
| | | | | | | |

FIG. 7

| 170 ↗ | | | | | | |
|---|---|---|---|---|---|---|
| CHANNEL CONTENT ID ⌐134 | GENERIC USER INTEREST PROFILE ⌐154 | USER URL INFO_1 ⌐172 | USER URL LAYOUT_1 ⌐174 | USER URL INFO_2 ⌐176 | USER URL LAYOUT_2 ⌐178 | ⋮ |
| | | | | | | |
| | | | | | | |
| | | | | | | |

FIG. 8

METHOD AND APPARATUS FOR AUTOMATICALLY ACCESSING WEB PAGES BASED ON TELEVISION PROGRAMMING INFORMATION

BACKGROUND OF THE INVENTION

1. Field of the Invention

The present invention relates generally to video systems, and more specifically to a system and method for providing access to preselected Web sites via the internet based on television program schedule information.

2. Description of the Prior Art

The internet may be accessed by end users via an on-line access device such as a personal computer or a Web television. A Web television generally includes many of the components of a conventional television, such as a television controller, a video processor, an audio processor, and the like. However, unlike a conventional television, a Web television also includes an internet module, which permits the Web television to be used as an on-line access device. Accordingly, a Web television may be used in a manner similar to a personal computer in order to gain access to on-line content providers. The television controller of a Web television typically responds to inputs from the end user in order to control the Web television.

Early Web televisions were limited to operation in either a normal television mode or an internet mode. In the normal television mode, video data received via the tuner is displayed on the TV screen. In the internet mode of operation, the user interfaces with the television controller using a remote control device to transmit character data to the internet module for communicating over the internet.

In order to solve the shortcomings of early Web televisions, new technologies have emerged wherein internet content and television content are merged. New technologies allowing integration of the World Wide Web and television have provided great opportunities for consumer electronics companies, cable operators, internet service providers (ISP's), and telecommunications companies to gain new subscribers and develop new revenue streams via advertising and e-commerce.

U.S. Pat. No. 5,818,935, entitled "Internet enhanced video system" (issued to Maa on Oct. 6, 1998), describes one example of a system for accessing the Internet based on an Internet information pointer encoded in a video signal. The system includes an Internet access device including a decoder adapted to extract the Internet information pointer encoded in the video signal, the access device being adapted to connect to the Internet to access the Internet based on the extracted Internet information pointer. The Internet information pointer encoder provides for encoding Internet access information onto a data transport portion of a video signal. The Internet information pointers provide for interaction between the video signal and the Web contents. In particular, by dubbing Uniform Resource Locator (URL) information onto a video signal, the Internet access device facilitates the transition from video viewing to a video content-related URL for Web browsing. An interface is provided for superimposing the text message menu on a TV screen and for selecting a text message menu item, and subsequently a URL.

U.S. Pat. No. 5,905,86, entitled "Apparatus and method of automatically accessing on-line services in response to broadcast of on-line addresses" (issued on May 18, 1999 to Palmer, et al.) discloses another method and apparatus for connecting a computer to electronic addresses in sync with an audio/video broadcast. Simultaneously with the broadcasting of audio/video programming, an address transmitter transmits an address, such as a URL, identifying an on-line service which contains information about the audio or video programming. This address is received by a computer and used to automatically access the on-line service. Preferably, the process is repeated with different addresses corresponding with different programming. It is also preferred that the addresses be sent via a paging system.

What is needed is a method and apparatus for automatically accessing and displaying a predetermined Web page associated with a selected television programming segment without the need to encode internet information within video signals provided by a video data provider, such as a television broadcasting network or cable company.

SUMMARY OF THE INVENTION

It is an object of the present invention to provide a method and apparatus for automatically accessing and displaying a predetermined Web page associated with a currently selected television programming segment without the need to encode internet information within video signals provided by a video data provider, such as a television broadcasting network or cable company.

Briefly, a presently preferred embodiment of the present invention provides a client system and a dedicated server, the client system having a processor, a memory unit coupled to the processor, an internet module coupled for communication with the processor and providing communication with remote sites including the dedicated server via the internet, a television tuner coupled for communication with the processor and being operative to receive a video input signal having a plurality of video channels carrying video data, and a video processing unit coupled for communication with the processor and being operative to provide a video output signal for displaying images on a television, a process for accessing Web pages associated with corresponding portions of the video data.

The process includes the steps of: establishing a link between the dedicated server and the client system via the internet; determining a selected channel parameter indicative of a selected one of the video channels received by the television tuner of the client system; and determining a particular time parameter indicative of a particular time at the client site, the selected channel parameter and the particular time parameter being associated with a particular portion of video data to be transmitted to the client system via the selected video channel at the particular time. These three steps are implemented by the client system.

The process also includes the steps of determining a matching Web address associated with the particular portion of video data, the matching Web address being determined by comparing the particular time parameter and the selected channel parameter to electronic program schedule information including a plurality of program schedule segments each including a corresponding time frame parameter indicative of an associated time frame, and a corresponding channel parameter indicative of an associated one of the video channels, each of the program schedule segments being associated with a corresponding portion of video data to be received by the client system via the associated channel during the associated time frame, The electronic program schedule information is provided by the dedicated server.

In a first embodiment, the electronic program schedule information is downloaded from the dedicated server to the client system, and stored in the memory unit of the client system. In this embodiment, the step of determining the matching Web address is executed by the client system by comparing the particular time parameter and the selected channel parameter to the program schedule segments stored in the memory unit of the client system.

In a second embodiment, the step of determining the matching Web address is executed by the server based on client information transmitted from the client system to the server. The client information included the selected channel parameter and the particular time parameter. In this embodiment, the server is operative to select the matching Web page based on the client system information.

Further steps of the process include: providing a matching Web page indicated by the matching Web address to the client system via the internet; receiving the particular portion of video data carried by the selected video channel via the television tuner; and displaying the matching Web page and the particular portion of video data on the television.

An important advantage of the present invention is that it is not necessary to encode internet information, such as hypertext links and URL's, within the television signal in order to automatically access internet content associated with television content.

The foregoing and other objects, features, and advantages of the present invention will be apparent from the following detailed description of the preferred embodiment which makes reference to the several figures of the drawing.

IN THE DRAWING:

FIG. 1 is a generalized block diagram of a Web/television hybrid network in accordance with the present invention, the network including a client system operative to communicate with a dedicated server Web site via the internet, the client system also being operative to receive portions of video data, and to display portions of the video data associated with television program segments along with corresponding matching Web pages on a television;

FIG. 3 is a table diagram illustrating client information stored at the dedicated server Web site, the client information being used for tracking registered users of the Web/television hybrid network of FIG. 1;

FIG. 4 is a table diagram illustrating electronic program schedule information downloaded from the dedicated server to the Web television system of FIG. 1;

FIGS. 5 and 6 are table diagrams illustrating specific and generic user interest profile information used for determining mapping between segments of the program schedule information and corresponding Web pages based on the interests of particular users;

FIGS. 7 and 8 are table diagrams illustrating mapping information used to select Web-pages corresponding with program schedule segments for a particular client;

Figure 9A:
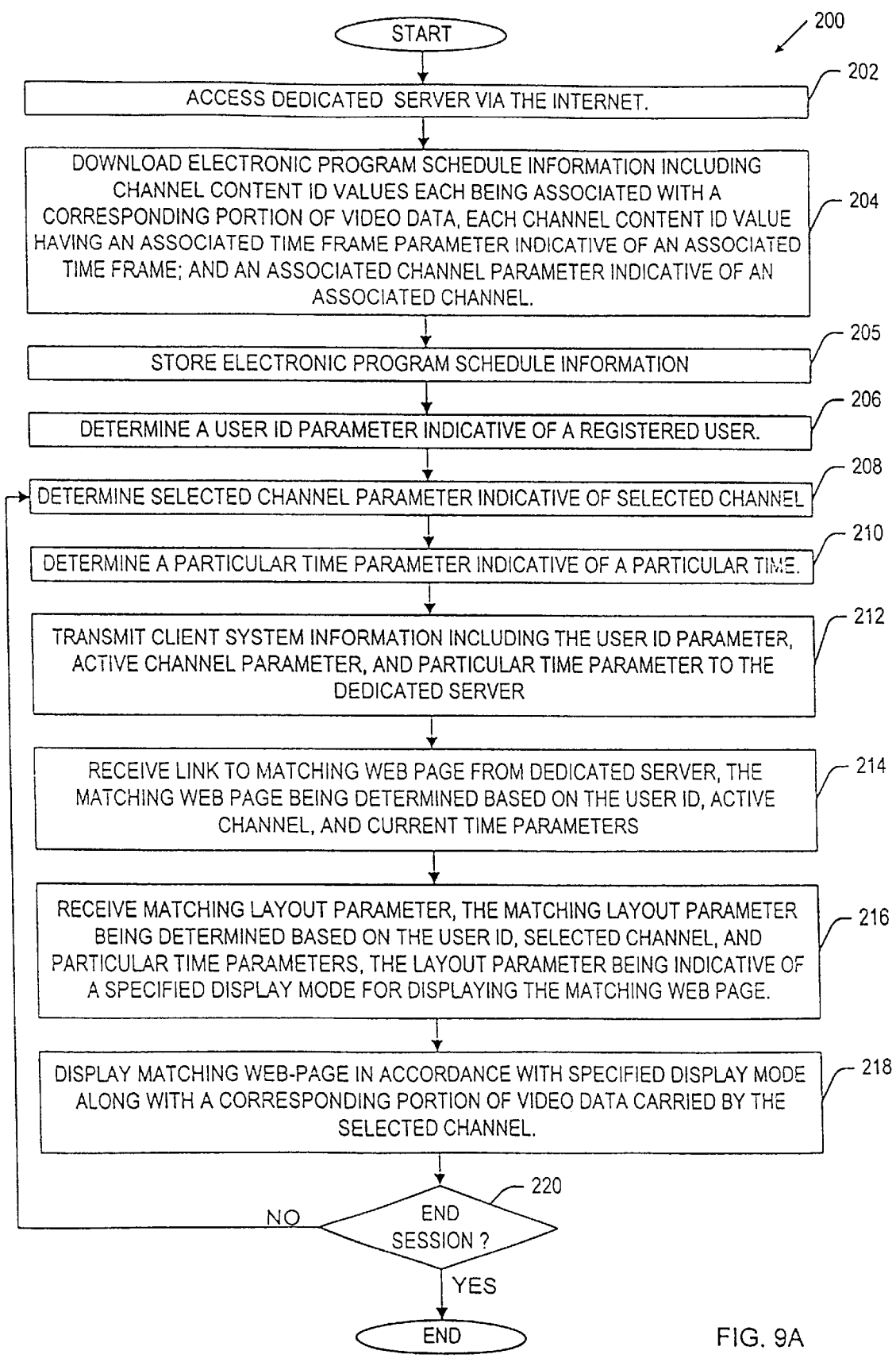
Figure 9B:
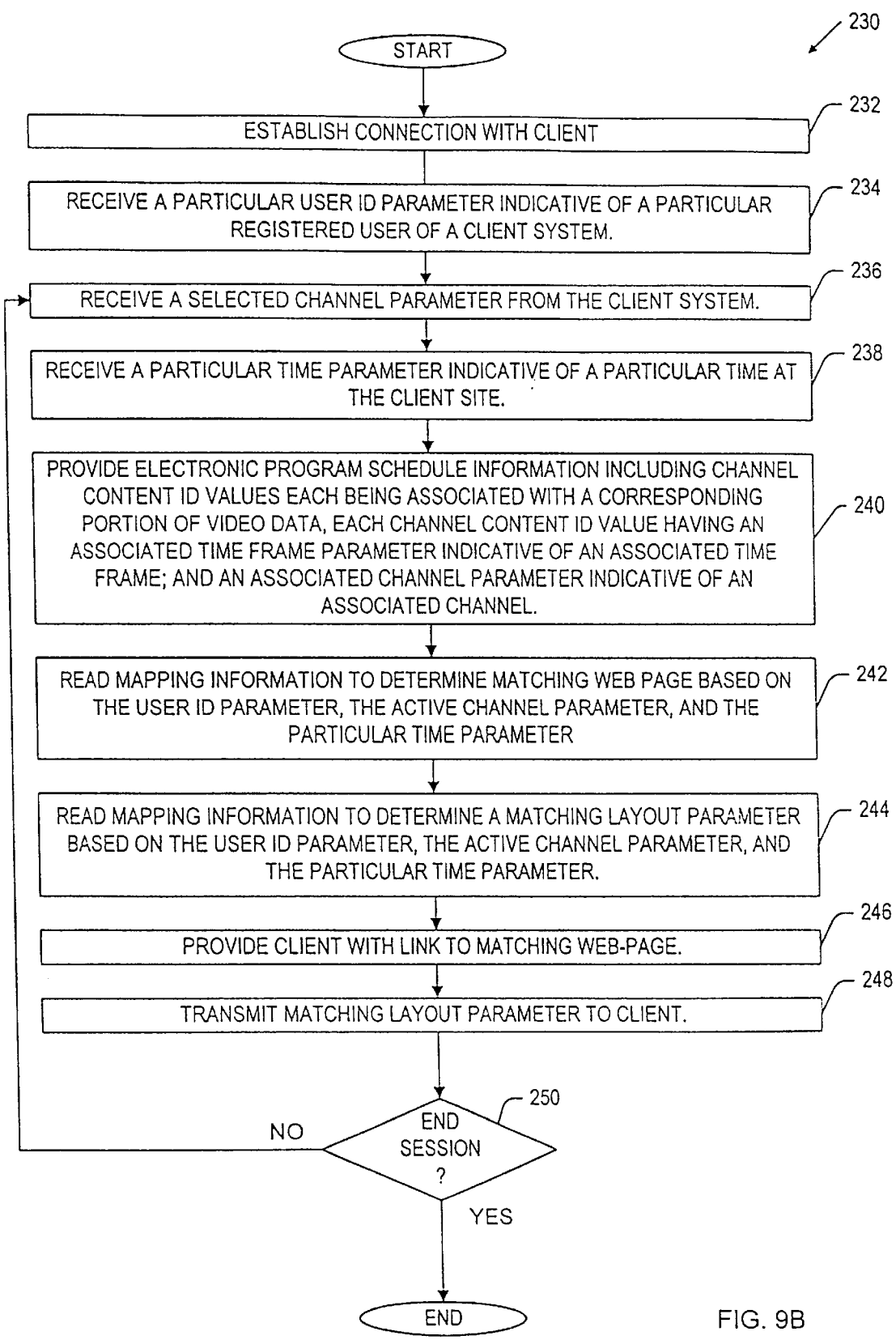
Figure 10:
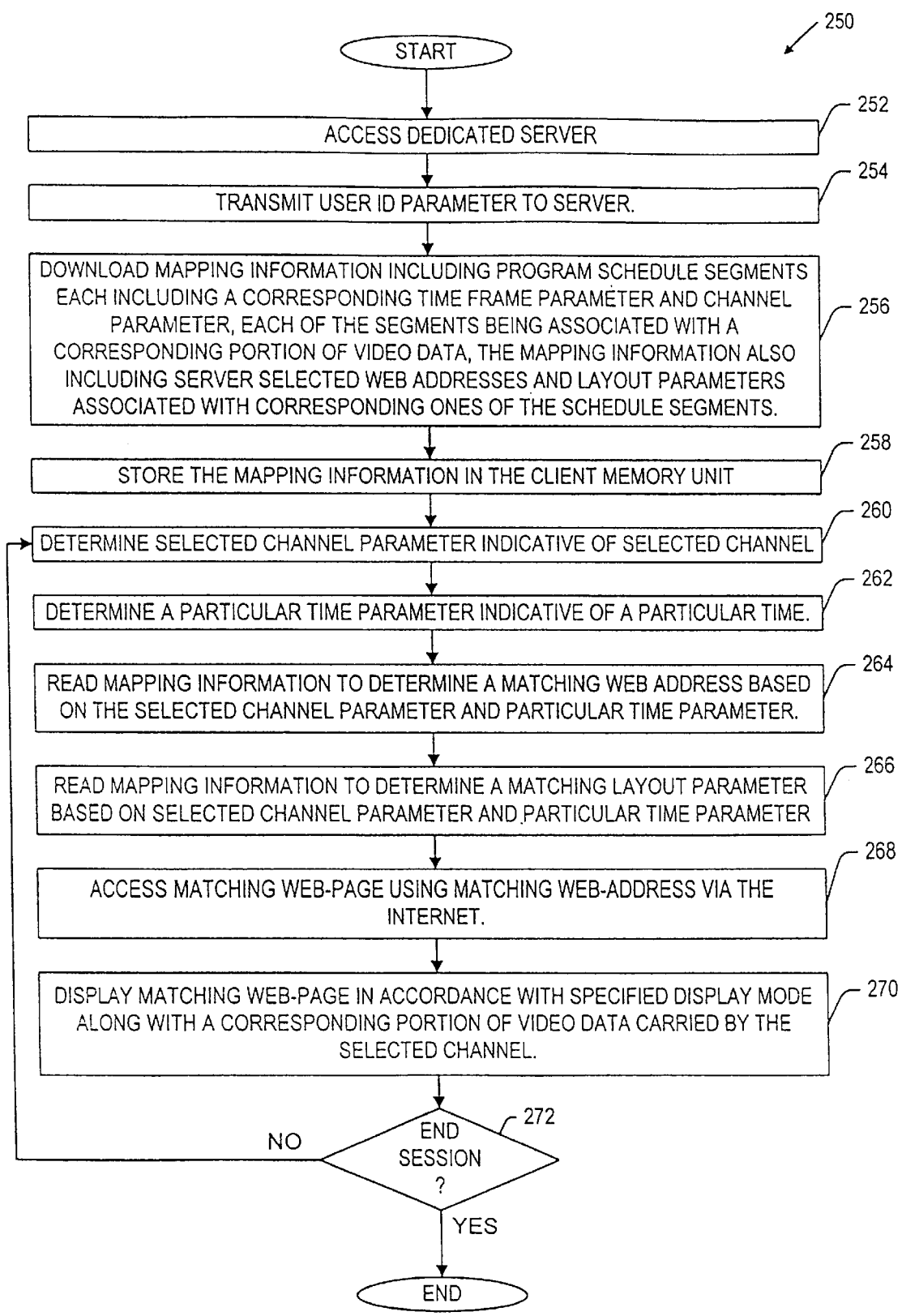

FIGS. 9A and 9B are flow charts illustrating steps of a client side process and a server process respectively, the processes providing for automatically accessing and displaying matching Web pages associated with selected television programming segments in accordance with a first embodiment of the present invention; and FIG. 10 is a flow chart illustrating steps of a client process for accessing a matching Web page associated with a selected television programming segment in accordance with a second embodiment of the present invention.

DETAILED DESCRIPTION OF THE PREFERRED EMBODIMENTS

Figure 1:
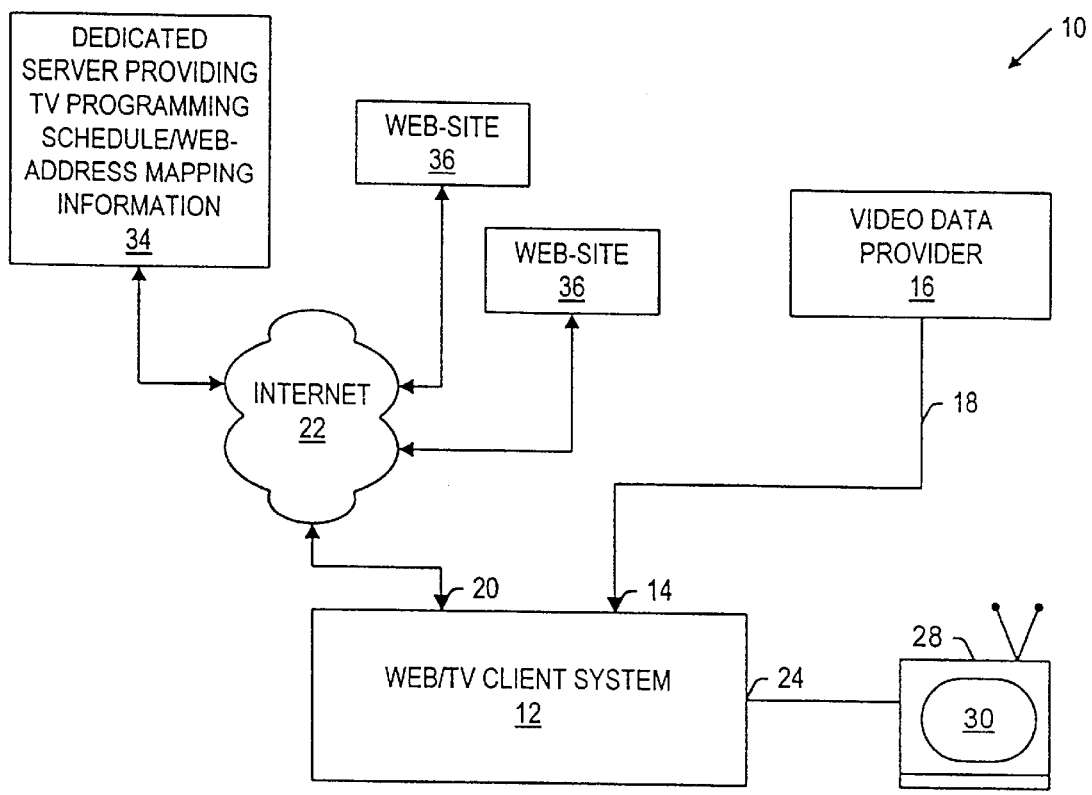

FIG. 1 shows a generalized block diagram of a Web/television hybrid network at 10 in accordance with the present invention, the network including a Web television client system 12. The client system 12 includes: a television signal input 14 coupled to receive an input video signal from a video data provider 16 (e.g., a television broadcast network, cable television provider, or the like) via a video transmission medium 18 (e.g., radio broadcast, satellite communication, cable network, or the like); an internet access port 20 coupled for communication with the internet 22 including the World Wide Web via a communication medium 23; and a video signal output 24 for providing a video output signal adapted for a television 28 having a screen 30, the video output signal for displaying images on the screen 30.

The Web/television hybrid network 10 further includes a dedicated server 34 which is operative to provide Web/TV programming schedule mapping information including: a plurality of programming schedule segments each being associated with a corresponding portion of video data to be received by the client system 12 from the video data provider 16 via a corresponding one of the video channels during a corresponding time frame; and a plurality of Web addresses associated with corresponding ones of the schedule segments, each of the Web addresses indicating a corresponding one of a plurality of Web sites 36 each having a server operative to provide a Web page associated with a corresponding one of the program schedule segments. In accordance with them present invention, each of the Web sites 36 may also provide Java programs, Java scripts, HTML triggers, HTML, etc. The contents and use of the Web/TV programming schedule mapping information provided by the server 34 is further explained below. In an alternative embodiment, the client system 12 may communicate with the dedicated server 34 via a dial up telephone line connection.

Figure 2:
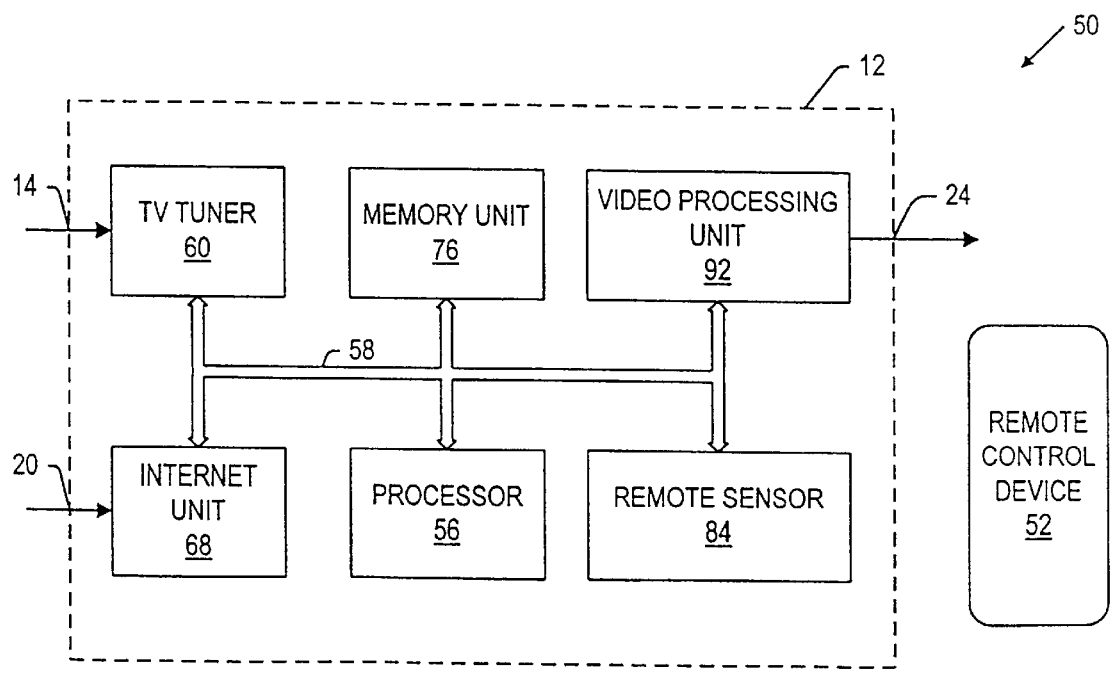
FIG. 2 is a circuit block diagram of the client system of FIG. 1.

FIG. 2 shows a circuit block diagram at 50 of the Web television system 12 including a remote control device 52 providing a user with an interface for selecting television programming options and for controlling communications via internet 22 (FIG. 1). In the depicted embodiment, the system 12 includes: a processor 56 coupled with a bus 58; a television tuner 60 coupled for communication with the processor via the bus 58, the tuner being coupled to receive the input video signal via input 14; an internet module 68 coupled for communication with the processor via the bus 58, and also being coupled for communication with the internet via the internet access port 20; a memory unit 76 coupled for communication with the processor via the bus, the memory unit for storing the Web/TV programming schedule mapping information table downloaded from the dedicated server 34 via the internet module 68 as further described below; a video processing unit 92 coupled for communication with the processor and the TV tuner via the bus 58, the video processing unit 92 being operative to generate the video output signal provided via output 24 to the television 30 (FIG. 1); and a remote sensor 84 coupled for communication with the processor via the bus, the sensor 84 for receiving remote control signals from the remote control device 52. In one embodiment, the remote control device 52 and sensor 84 transmit and receive infrared signals. Alternatively, the remote control device 52 may be hardwired to the Web television system, or the remote control device may transmit wireless signals of a kind other than infrared. The remote control device may be a track-ball type of interface, a keyboard type remote control device, or the like. In a preferred embodiment, the memory unit 76 includes flash memory.

The processor 56 is preferably configured to run a Web browser or similar software to allow a user to interactively access the Internet. The internet module 68 may include any of a variety interface units well known in the art for interfacing with the internet via the communication medium 23 (FIG. 1) which may be a phone line, a cable, an integrated services digital network, a digital subscriber line (which may include an asymmetrical digital subscriber line, a rate adapted digital subscriber line, or the like), a satellite link, or any other type of medium which supports communication with on-line content providers. In an embodiment, the internet module 68 includes a modem and the communication medium 23 (FIG. 1) is a phone line. Also, in an embodiment, the internet access port 20 includes an Ethernet port EN and a phone line port PL for connecting the internet module to the communication medium so that the internet module may transmit and receive information to and from remote on-line devices.

The video processing unit 92 receives video data from the TV tuner 60, and also receives internet data including Web pages from the internet module 60. The video processing unit 92 is operative to display the internet data and video data on the television screen 30 (FIG. 1). Video processing components required for superimposing a Web page on a primary image are well known in the art. The video processing unit 92 includes raster trace logic which is modified to produce two separate image fields. In one embodiment, the video processing unit 92 includes logic for implementing a split-screen display process. In another embodiment, the video processing unit 92 includes logic for implementing a picture-in-picture (PIP) display. With a PIP display, the second program is embedded in the first program, whereas with a split-screen display, the two programs are typically viewed side by side on the left and right portions of the television screen.

When the Web browser is active, the processing unit generates a video signal representing the activities of the Web browser. This Web video signal is fed into the video display processor. In an embodiment, the user is able to toggle back and forth between TV viewing and Web browsing. This toggling is preferably controlled by the user through the IR receiver. In addition, the present invention does not preclude the possible operation of the Web browsing and the TV viewing at the same time. For example, the video display processor can be implemented such that it can reduce the display size of the video program content to the % of the TV screen, and leave the unused screen area for the browser to display other contents, such as a stock ticker or news headlines scrolling across the bottom of the screen. It is also be possible to display information related to Internet sites scrolling across the screen 30 (FIG. 1).

The system 12 of the present invention is preferably embodied in a set-top-box (STB) that can be attached to a TV or VCR as per existing Web TV STB's. This arrangement allows the device to be used with existing video equipment. However, it is also possible to incorporate the device of the present invention directly into a TV or VCR.

FIG. 3 shows a table diagram illustrating client information at 110 received and stored by the dedicated server Web site 34 (FIG. 1) for tracking registered users of the Web/television hybrid network 10 (FIG. 1) in accordance with the present invention. The client information 110 includes a plurality of user entries 112 each being associated with a registered user. Each of the user entries 112 includes: an associated user ID parameter 114 generated by the dedicated server for the purpose of uniquely identifying the corresponding user; associated credit card information 116 associated with a credit account for the corresponding user; an associated shipping address 118 of the corresponding user; and personal information 120 associated with the corresponding user. The personal information 120 may include demographic information associated with the user such as age, sex, ethnicity, income information, marital status, hobbies and interests, occupation, membership in societies, and financial information such as stocks held by the user. The client information 110 may be used for billing purposes.

In accordance with the present invention, the client information 110 may also be used to generate user profile interest information which is used, along with other parameters, for the purpose of selecting a Web page to be linked to a particular client.) As further explained below, a Web page selected by the dedicated server 34 (FIG. 1) for a particular user upon activation of a particular channel during a particular time may include information personalized for the user. For example, the selected Web page may include advertising information or fill-in order forms targeted at a user fitting the interest profile of the particular client viewing a particular portion of video data on a particular channel during a particular time. As another example, the selected Web page may include personalized stock market information to be displayed by the system 12 (FIG. 1) in parallel with a portion of video data including stock market news. The personalized stock market information may be displayed in the form of a stock ticker as further described below.

In an embodiment, the client information including the credit card information 116, shipping address 118, and personal information 120 is provided by a user to the dedicated server 34 (FIG. 1) via an electronic fill-in form as is well known in the art. Also in an embodiment, the fill-in form may be accessed by a user of the system 12 (FIG. 2) by logging on to the dedicated server via the internet. The user may then use the remote control device 52 (FIG. 2) to enter the specified client information onto the form for transmittal back to the server.

FIG. 4 shows a table diagram illustrating electronic program schedule information at 130, the information 130 being provided by the dedicated server Web site 34 (FIG. 1). The program.schedule information 130 includes a plurality of program schedule segments 132 each including: a corresponding channel content ID parameter 134 uniquely identifying a corresponding portion of video data to be transmitted via the video transmission medium 18 (FIG. 1) via a corresponding channel during a corresponding time frame; a corresponding channel parameter 136 indicative of the corresponding channel; a corresponding time frame parameter 138 indicative of the corresponding time frame; and a corresponding content description field for storing a description, such as a title, of the corresponding portion of video data. As further explained below, the program schedule information 130 is used to determine a particular one of the channel content ID values 134 associated with a selected channel and particular time at the system 12 (FIG. 1). As further explained below, in one embodiment, the program schedule information 130 is downloaded from the dedicated server to the system 112 (FIG. 1) for use as a program schedule guide.

FIG. 5 shows a table diagram illustrating specific user interest profile information stored at the server Web site 34

(FIG. 1). The depicted table includes a plurality of entries 146 each including a corresponding one of the user ID values 114, and a specific user interest profile parameter 148 associated with the corresponding user ID value 114. Each specific user interest profile parameter 148 is determined based on the client information 110 (FIG. 3), and particularly the personal client information 120 (FIG. 3) which may be evaluated in order to specifically categorize the users into groups for the purpose of assigning a specific user interest profile parameter 148 to each corresponding user.

FIG. 6 shows a table diagram illustrating generic user interest profile information at 150 stored at the server Web site 34 (FIG. 1). The table 150 includes a plurality of entries 152 each including a corresponding one of the user ID values 114, and a generic user interest profile parameter 154 associated with the corresponding user ID value 114. The generic user interest profile parameters 148 may be assigned to corresponding one of the user ID values 114 in a case wherein no entries have been received for the personal information 120 (FIG. 3) form the corresponding user.

FIG. 7 shows a table diagram illustrating specific user interest profile mapping information at 160, the mapping information 160 being stored at the dedicated server Web site. As shown in table 160, each of the channel content ID values 134 has a plurality of the specific user interest profile parameters 148 associated therewith. For a given channel content ID value 134, identifying a particular program schedule segment, and a given specific user interest profile value 148, identifying the specific user interest profile for the particular user, the table 160 provides: corresponding first and second user uniform resource locator (URL) information parameters 162 and 166 indicating corresponding first and second matching Web pages associated with the particular user and the particular program schedule segment; and corresponding first and second user URL layout parameters 164 and 168 indicating corresponding first and second display modes for displaying the first and second matching Web pages respectively. The URL information parameters 162 and 166 may also indicate Java programs, Java scripts, HTML triggers, HTML, etc.

The user URL layout parameters 164 and 168 provide instructions for the system 12 (FIG. 2) in displaying the first and second matching Web pages on the television screen 30 (FIG. 1). In an embodiment, the display modes include a picture in picture (PIP) display mode, and a banner display mode. As an example, the first matching Web page may be displayed on the TV screen in a PIP display mode, and the second matching Web page may be displayed on the TV screen in a banner display mode, both Web pages being displayed simultaneously with the particular program schedule segment identified by the corresponding channel content ID 134. In an embodiment, the Web pages include streaming audio and video animation graphics.

FIG. 8 shows a table diagram illustrating generic user interest profile mapping information at 170, the mapping information 170 being stored at the dedicated server Web site. The generic user interest profile mapping information 170 is similar to the specific user interest profile mapping information 160 (FIG. 7) except that the matching Web pages and display modes are selected based on the generic user interest profile parameters 154 (FIG. 6). The generic profile mapping information 170 may be used in cases in which no personal client information 120 is provided.

For a given channel content ID value 134, identifying a particular program schedule segment, and a given generic user interest profile value 148, identifying a generic user interest profile for the particular user, the table 170 provides: corresponding first and second user URL information parameters 172 and 176 indicating corresponding first and second matching Web pages associated with the particular user and the particular program schedule segment; and corresponding first and second user URL layout parameters 174 and 178 indicating corresponding first and second display modes for displaying the first and second matching Web pages respectively.

In each of several embodiments of the present invention, a general process is provided for linking matching Web pages to the client system, the matching Web pages being associated with corresponding segments of the video data received by the client system. The general process includes the steps of: establishing a link between the dedicated server and the client system via the internet; determining a selected channel parameter indicative of a selected one of the video channels received by the television tuner of the client system; determining a particular time parameter indicative of a particular time at the client site, the selected video channel and the particular time being associated with a particular portion of video data to be transmitted to the client system via the selected video channel at the particular time; determining a matching Web page associated with the particular portion of video data, the matching Web page being determined based on the particular time parameter and the selected channel parameter; linking the client system to the matching Web page via the internet; receiving the particular portion of video data carried by the selected video channel at the television tuner; and displaying the matching Web page and the particular portion of video data on the television screen.

In a first embodiment of the present invention, the actual sub-process of determining the matching Web page is implemented by the dedicated server 34 (FIG. 1) after the particular time parameter and the selected channel parameter are transmitted from the client system 12 to the dedicated server 34 (FIG. 1). In a second embodiment of the present invention, the actual sub-process of determining the matching Web page is implemented by the client system after downloading the information contained in tables 130, 160, and 170 of FIGS. 4, 7, and 8 respectively from the dedicated server to the client system.

FIG. 9A shows a flow chart at 200 illustrating steps of a client side sub-process for automatically accessing and displaying a selected Web page associated with a selected television programming segment in accordance with the first embodiment of the present invention. In an embodiment, the depicted sub-process is implemented by instructions executed by the processor 56 (FIG. 1) of the client system. In an alternative embodiment, the sub-process may be implemented by firmware logic.

The sub-process 200 begins with a step 202 in which the system 12 (FIG. 1) accesses the dedicated server 34 (FIG. 1). In a preferred embodiment, step 202 includes a loading and searching of the Web address of the dedicated server by an internet interface application executed by the processor 56 (FIG. 1). In step 204, the electronic program schedule information 130 (FIG. 4) is downloaded from the dedicated server. In step 205, the program schedule information is stored in the memory unit 76 (FIG. 2). In the first embodiment of the present invention, the program schedule information is used by the client system only as a television program guide. However, in the second embodiment, further described below, the program schedule information is used by the client system along with mapping tables 160 or 170 (FIGS. 7 and 8) to actually determine the matching Web pages and matching layout parameters.

From step 205 the sub-process proceeds to step 206 in which the user ID parameter is determined. In a preferred embodiment, the user ID parameter is entered by the user of the system 12 (FIG. 1) and stored in the memory unit 76 (FIG. 1), and therefore in step 206, the user ID parameter is determined by reading the user ID parameter 114 (FIG. 3) from the memory unit 76. In step 208, a selected channel parameter is determined, the selected channel parameter being indicative of a current user selected one of the video channels received at the television signal input 14 (FIG. 1) of the system 12.

From step 208 the sub-process proceeds to step 210 in which a particular time parameter indicative of a particular time at the particular client site is determined. In one embodiment, the particular time parameter is indicative of the current time at the particular client site. However, because of anticipated internet delay times incurred as the client system 12 links to a Web page, it may be desirable that the particular time parameter be representative of a time equal to the current time plus an anticipated internet delay time. In one embodiment, the system 12 (FIG. 2) includes a system clock which may be referred to determine the a current local time. In another embodiment, the current time of day is determined with reference to a television broadcast system clock signal received by the system 12 (FIG. 1) from the video data provider 16 via one of the video channels received at the TV signal input of the system.

In step 212, the client system 12 (FIG. 1) transmits client system information to the dedicated server 34 (FIG. 1), the client system information including the user ID parameter 114 (FIG. 3), the selected channel parameter determined in step 208, and the particular time parameter determined in step 210. As further explained below, the dedicated server determines a matching Web page and a matching layout parameter based on the user ID parameter, selected channel parameter, and particular time parameter uploaded from the client system. In step 214, the client system 12 (FIG. 1) is provided with a link to the matching Web page, the link being provided by the dedicated server 34 (FIG. 1) as further explained below.

In step 216, the client system 12 (FIG. 1) receives the matching layout parameter from the server. The matching layout parameter essentially provides display instructions to the client system 12 (FIG. 1), the layout parameter indicating a selected one of a plurality of possible display modes which the client system may execute in displaying the matching Web page along with the corresponding portion of video data on the television screen 30.

From step 216, the sub-process proceeds to step 218 in which the matching Web page and the corresponding portion of video data carried by the currently selected channel are simultaneously displayed on the television screen 30 (FIG. 1) in accordance with the display mode specified by the URL layout information (e.g., a split screen format, a PIP format, a banner format). The user may then use the remote control device 52 (FIG. 1) to interact with the displayed matching Web page if appropriate.

FIG. 9B shows a flow chart illustrating steps of a server sub-process at 230, the server sub-process 230 providing a matching Web page to the client system 12 (FIG. 1) based on the client system information including user ID parameter, currently selected channel parameter, and particular time parameter provided by the client system to the server system in step 212 (FIG. 9A) of the client side system 200 (FIG. 9A). The server sub-process 230 begins with step 202 in which the dedicated server 34 (FIG. 1) establishes a connection with the client system 12 (FIG. 1).

In steps 234, 236, and 238, the dedicated server receives the user ID parameter, the selected channel parameter, and the particular time parameter uploaded from the client system 12 (FIG. 1) in step 212 (FIG. 9A) of the client side sub-process 200 (FIG. 9A). From step 238, the depicted sub-process proceeds to step 240 in which the dedicated server provides the electronic program schedule information 130 (FIG. 4) including the channel content ID parameters 134, channel parameters 136, and time parameters 138. The content description parameters 140 (FIG. 4) are provided to the client system optionally. The electronic program schedule information 130 may be used by the user of the client system as a television program guide.

From step 240, the sub-process proceeds to step 242 in which the dedicated system server determines the matching Web page based on the particular user ID parameter, the selected channel parameter, and the particular time parameter. In step 244 of the server sub-process 230 (FIG. 10), the dedicated server system determines the matching layout parameter based on the user ID parameter, the selected channel parameter, and the particular time parameter.

In a preferred embodiment, the matching Web page and matching layout parameter are determined by accessing tables 110, 130, 144, 150, 160, and 170 described above in reference to FIGS. 3 through 8. Preliminary steps include: (1) comparing the selected channel parameter and particular time parameter received in steps 236 and 238 to the channel parameters 136 (FIG. 4) and time frame parameters 138 (FIG. 4) of table 130 (FIG. 4) to determine a matching one of the channel content identification parameters 134 (FIG. 4) of table 130; (2) comparing the particular user ID parameter received in step 234 with the user ID parameters 114 (FIG. 3) to determine a matching one of the user ID parameters 114 of table 110 (FIG. 3); and (3) determining whether any client personal information 120 (FIG. 3) has been provided to the server for the particular client.

If client personal information 120 (FIG. 3) has previously been provided to the server for the particular client, the particular user ID parameter is compared with the user ID parameters 114 (FIG. 5) stored in the specific user interest profile information table 144 (FIG. 5) to determine a matching one of the specific user interest profile parameters 148 (FIG. 5). Finally, the specific user interest profile mapping information table 160 (FIG. 7) is indexed based on the matching one of the specific user interest profile parameters 148 and the matching one of the channel content ID parameters 134 to determine at least one matching Web page and at least one matching layout parameter from table 160 (FIG. 7) as described above.

If no client personal information 120 (FIG. 3) has previously been provided to the server for the particular client, the particular user ID parameter is compared with the user ID parameters 114 (FIG. 5) stored in the generic user interest profile information table 150 (FIG. 6) to determine a matching one of the generic user interest profile parameters 154 (FIG. 6). Finally, the generic user interest profile mapping information table 170 (FIG. 8) is indexed based on the matching one of the generic user interest profile parameters 154 and the matching one of the channel content ID parameters 134 to determine at least one matching Web page and at least one matching layout parameter from table 170 (FIG. 8) as described above.

In step 246, the dedicated server provides the client system with a link to at least one matching Web page based on at least one of the user uniform resource locator (URL) information parameters 162 and 166 of FIG. 7 (or the URL parameters 172 and 176 of FIG. 8) indicating the corresponding at least one matching Web page.

In step 248, the dedicated server provides the client system with the at least one matching layout parameter 164, 168, 174, and 178 (FIGS. 7 and 8) associated with the at least one matching Web page for which a link has been provided in step 246. From step 248, the server sub-process proceeds to step 250 in which it is determined whether a current session between the client system and the dedicated server system has ended, and if so, the depicted server sub-process 230 ends. Alternatively, if it is determined at 250 that the current session is not ended, the sub-process proceeds back to step 236 and executes steps 236 through 248 again. In this manner, the system is able to provide new links to new Web pages associated with corresponding new portions of video data received when the user selects a new channel at the client system 12 (FIG. 1).

FIG. 10 shows a flow chart at 250 illustrating steps of a process for automatically accessing and displaying a selected Web page associated with a selected television programming segment in accordance with the second embodiment of the present invention. In an embodiment, the depicted process is implemented by instructions executed by the processor 56 (FIG. 1) of the client system. In an alternative embodiment, the sub-process may be implemented by firmware logic. As mentioned above, in the second embodiment of the present invention, the required steps of determining the matching Web pages and matching layout parameters are implemented by the client system after downloading the information contained in tables 130, 160, and/or 170 of FIGS. 4, 7, and 8 respectively from the dedicated server to the client system.

The process 250 begins with a step 252 in which the client system 12 (FIG. 1) accesses the dedicated server 34 (FIG. 1). In a preferred embodiment, step 252 includes a loading and searching of the Web address of the dedicated server by an internet interface application executed by the processor 56 (FIG. 1).

From step 252 the sub-process proceeds to step 254 in which the user ID parameter is transmitted from the client system to the dedicated server. As in the first embodiment of the present invention, the user ID parameter is preferably stored in the memory unit 76 (FIG. 1).

In step 256, mapping information is downloaded, or received, from the dedicated server to the client system. The mapping information includes the electronic program schedule information 130 (FIG. 4) and a matching portion of either the specific user interest profile mapping information 160 (FIG. 7) or the generic user interest profile mapping information 170 (FIG. 8). As mentioned above, the generic profile mapping information 170 (FIG. 8) is generally used for mapping channel content ID values 134 (FIG. 4) to matching URL information and matching layout parameters in cases in which no personal client information 120 (FIG. 3) is provided, whereas the specific profile mapping information 160 (FIG. 7) is generally used in cases in which personal client information 120 (FIG. 3) is provided. Note that it is not necessary to download the entirety of either the specific or generic profile mapping information tables, but only the portions associated with the particular user's interest profile which is determined by the dedicated server 34 based on the user ID parameter transmitted to the server in step 254 using tables 144 and 150 (FIGS. 5 and 6).

Therefore, in 256, the client system receives the appropriate portion of the generic user profile mapping information 170 (FIG. 8) in cases in which no personal client information 120 (FIG. 3) has previously been provided to the server. Alternatively, the client system receives the appropriate portion of the specific user profile mapping information 160 (FIG. 7) for cases in which personal client information 120 (FIG. 3) has previously been provided to the server.

In step 258, the mapping information received in step 256 is stored in the memory unit 76 (FIG. 2). In step 260, a selected channel parameter is determined, the selected channel parameter being indicative of a current user selected one of the video channels received at the television signal input 14 (FIG. 1) of the system 12. From step 260 the process proceeds to step 262 in which a particular time parameter indicative of a particular time at the particular client site is determined. Steps 260 and 262 are similar to steps 208 and 210 of sub-process 200 (FIG. 9A) and the above described manner of implementing those steps may be applied here similarly.

From step 262 the process proceeds to step 264 in which the client system determines a matching Web address based on the selected channel parameter, and the particular time parameter determined in steps 260 and 262. In step 266, the client system determines a matching layout parameter based on the selected channel parameter, and the particular time parameter.

Preferably, the matching Web page and matching layout parameter are determined by reading table 130 (FIG. 4) and the downloaded server selected portions of the selected one of tables 160 and 170 (FIGS. 7 and 8) as described above. Preferably, these steps include comparing the selected channel parameter and particular time parameter, determined in steps 260 and 262 respectively, to the channel parameters 136 (FIG. 4) and time frame parameters 138 (FIG. 4) of table 130 (FIG. 4) to determine a matching one of the channel content identification parameters 134 (FIG. 4) of table 130. Subsequently, the downloaded server selected portion of the appropriate one of the specific user interest profile mapping information table 160 (FIG. 7) and generic user interest profile mapping information table 170 (FIG. 8) is read and compared to the matching one of the channel content ID parameters 134 (FIG. 4) in order to determine at least one matching Web address and at least one matching layout parameter.

In step 264, the client system determines at least one of the user URL information parameters 162 and 166 of FIG. 7 (or the URL parameters 172 and 176 of FIG. 8) indicating the corresponding at least one matching Web address. In step 266, the client system determines at least one matching layout parameter 164, 168, 174, and 178 (FIGS. 7 and 8) associated with the at least one matching Web address.

In step 268, the client system accesses a Web-server indicated by the matching Web-address via the internet. From step 268, the sub-process proceeds to step 270 in which the client system displays the matching Web page and the corresponding portion of video data carried by the currently selected channel simultaneously on the television screen 30 (FIG. 1) in accordance with the display mode specified by the URL layout information (e.g., a split screen format, a PIP format, a banner format).

From step 270, the depicted process proceeds to step 272 in which it is determined whether a current session between the client system and the dedicated server system has ended, and if so, the depicted process ends. Alternatively, if it is determined at 272 that the current session is not ended, the process proceeds back to step 260 and repeats steps 260 through 272. In this manner, the client system 12 (FIG. 1) is able to access new Web pages associated with corresponding new portions of video data received when the user selects a new channel.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. In a network including a client system and a dedicated server, the client system having a processor, a memory unit coupled to the processor, an internet module coupled for communication with the processor and providing communication with remote sites including the dedicated server via the internet, a television tuner coupled for communication with the processor and being operative to receive a video input signal having a plurality of video channels carrying video data, and a video processing unit coupled for communication with the processor and being operative to provide a video output signal for displaying images on a television, a process for providing information resources associated with corresponding portions of the video data, the process comprising the steps of:

establishing a link between the dedicated server and the client system via the internet;

determining a selected channel parameter indicative of a selected one of the video channels received by the television tuner of the client system;

determining a particular time parameter indicative of a particular time at the client site, said selected channel parameter and said particular time parameter being associated with a particular portion of video data to be transmitted to the client system via said selected video channel at said particular time;

transmitting client information to said server, said client information including said selected channel parameter and said particular time parameter;

determining a matching Web address associated with said particular portion of video data, said matching Web address being determined by comparing said particular time parameter and said selected channel parameter to electronic program schedule information including a plurality of program schedule segments each including a corresponding time frame parameter indicative of an associated time frame, and a corresponding channel parameter indicative of an associated one of the video channels, each of said program schedule segments being associated with a corresponding portion of video data to be received by the client system via said associated channel during said associated time frame;

providing a matching information resource indicated by said matching Web address to said client system via the internet;

receiving said particular portion of video data carried by said selected video channel via the television tuner;

processing said matching information resource; and displaying matching information associated with said matching information resource and also displaying said particular portion of video data on the television.

2. In a network as recited in claim 1 wherein said electronic program schedule information is provided by the dedicated server.

3. In a network as recited in claim 2 further comprising the steps of:

downloading said electronic program schedule information from the dedicated server to the client system;

storing said program schedule information in the memory unit of the client system; and wherein said step of determining said matching Web address is executed by the client system by comparing said particular time parameter and said selected channel parameter to said program schedule segments stored in the memory unit of the client system.

4. In a network as recited in claim 2 further comprising the step of transmitting client information from the client system to the server, said client information, including said selected channel parameter and said particular time parameter, the server being operative to select said matching information resource based on said client system information.

5. In a network as recited in claim 4 wherein said client information further comprises a user ID parameter indicative of a registered user of the client system.

6. In a network as recited in claim 4 wherein the server is further operative to determine matching layout information based on said client system information, said matching layout information being indicative of a selected one of a plurality of display modes for displaying said matching information on the television, the process further comprising the step of:

transmitting said matching layout information from the server to the client system;

wherein said step of displaying said matching information and said particular portion of video data on the television includes displaying said matching information in accordance with said selected display mode.

7. In a client system including a processor, a memory unit coupled to the processor, an internet module coupled for communication with the processor and providing communication with remote sites via the internet, a television tuner coupled for communication with the processor and being operative to receive a video input signal having a plurality of video channels carrying video data, and a video processing unit coupled for communication with the processor and being operative to provide a video output signal to a television, a process for accessing information resources associated with corresponding segments of the video data, the process comprising the steps of:

accessing a dedicated server Web site via the internet;

determining a selected channel parameter indicative of a selected one of the video channels received by the television tuner of the client system;

determining a particular time parameter indicative of a particular time at the client site, said selected video channel and said particular time being associated with a particular portion of video data to be transmitted to the client system via said selected video channel at said particular time;

transmitting client information to said server, said client information including said selected channel parameter and said particular time parameter, said server being operative to select a matching information resource associated with said particular portion of video data, said matching information resource being determined based on said client system information;

receiving a link to said matching information resource via the internet;

processing said matching information resource;

receiving said particular portion of video data carried by said selected video channel via the television tuner; and displaying matching information associated with said matching information resource and also displaying said particular portion of video data on the television.

8. In a client system as recited in claim 7 wherein said client information further comprises a user ID parameter indicative of a registered user of the client system.

9. In a client system as recited in claim 7 wherein said server is further operative to determine matching layout information based on said client system information, said matching layout information being indicative of a selected one of a plurality of display modes for displaying said matching information on the television, the process further comprising the step of:

receiving said matching layout information from said server;

wherein said step of displaying said matching information and said particular portion of video data on the television includes displaying said matching information in accordance with said selected display mode.

10. In a client system as recited in claim 9 wherein said selected display mode is selected from a group consisting of a picture in picture (PIP) display mode and a banner display mode.

11. In a client system as recited in claim 7 wherein said matching information resource includes a web page.

12. In a client system as recited in claim 7 wherein said server is further operative to provide electronic program schedule information including a plurality of program schedule segments each including a corresponding time frame parameter indicative of an associated time frame, and a corresponding one of said channel parameters, each of said program schedule segments being associated with a corresponding portion of video data to be received by said system via said corresponding channel during said corresponding time frame, the process further comprising the steps of:

downloading the electronic program schedule information from the dedicated server; and storing the program schedule information in the memory unit of the client system.

13. In a client system as recited in claim 7 further comprising the step of:

receiving a fill-in form from the server; and providing client personal information to the server via the fill-in form.

14. In a client system as recited in claim 7 wherein at least one of said information resources includes information compiled based on a user profile matching a pre-registered user of said system.

15. In a server Web site including a processor, an internet module coupled for communication with the processor, and a server memory unit coupled for communication with the processor, the internet module providing communication with a client system via the internet, the client system including a television tuner coupled to receive portions of video data from a video data provider which transmits said portions of video data via corresponding ones of a plurality of video channels during corresponding ones of a plurality of time frames in accordance with a television program schedule, the server memory unit providing storage of television program schedule information including channel parameters and time frame parameters indicative of the corresponding time frames during which the portions of video data are transmitted via the corresponding video channels, the server memory unit also providing storage of Web address information associated with the program schedule information, a server process of providing a particular client with links to information resources associated with corresponding ones of the portions of video data, the server process comprising the steps of:

receiving client system information from the particular client, said client system information including a selected channel parameter indicative of a selected one of the video channels, and a particular time parameter indicative of a particular time at the client site, said particular time parameter and said selected channel parameter being indicative of a particular one of the portions of video data;

determining a matching information resource that is associated with said particular portion of video data, said matching information resource being determined based on said client information; and providing the particular client with a link to said matching information resource via the internet.

16. In a server Web site as recited in claim 15 further comprising the step of providing the particular client with matching layout information indicative of a specified display mode for displaying said matching information resource.

17. In a server Web site as recited in claim 15 wherein said client information further includes a user identification parameter uniquely identifying the particular client.

18. In a server Web site as recited in claim 17 further comprising the steps of:

transmitting a fill-in form to the particular client system, said fill-in form requesting user personal information;

receiving said user personal information from a registered user of the particular client system via said fill-in form; and generating a specific user interest profile parameter associated with said registered user, said specific user interest profile parameter being associated with said user identification parameter.

19. In a server Web site as recited in claim 17 wherein said link to said matching information resource is provided via Web address information including a uniform resource locator.

20. In a system including a processor, a memory unit coupled to the processor, an internet unit coupled to the processor and also being coupled for communication with the internet, a television tuner coupled with the processor and also being coupled to receive a video signal having a plurality of channels, and a video processing unit coupled to the processor and operative to provide a video signal to a television, a process for displaying information on the television, the process comprising the steps of:

accessing a dedicated server via the internet, said server being operative to provide a selected set of mapping information including a plurality of programming schedule entries each including a corresponding time frame parameter indicative of an associated time frame, and a corresponding channel parameter indicative of an associated one of the channels, each of said schedule entries being associated with a corresponding portion of video data to be received by said system via said corresponding channel during said corresponding time frame, said mapping information also including a plurality of Web addresses associated with corresponding ones of said schedule entries, each of said web-addresses indicating a corresponding web-server operative to provide an information resource associated with said corresponding schedule segment;

downloading said mapping information and storing said mapping information in said memory unit;

determining a selected channel parameter indicative of a selected one of the video channels;

determining a particular time parameter indicative of a particular time;

determining a matching one of said program schedule segments based on said selected channel parameter and said particular time parameter;

reading said mapping information to determine a matching one of said Web-addresses that corresponds with said matching program schedule segment;

accessing via the internet a Web-server indicated by said matching Web-address;

downloading a matching information resource associated with said matching program schedule segment;

processing said matching information resource: and displaying matching information associated with said matching information resource and also displaying corresponding portion of video data carried by said selected channel.

21. A system for automatically accessing a matching information resource associated with a selected television programming segment based on program schedule mapping information, the system comprising:

a processor;

a television tuner coupled to the processor and also coupled to receive a video signal having a plurality of channels for carrying data including video data;

an internet module coupled to the processor, and also being coupled for communication with the internet, wherein said internet module is operative to download a selected set of mapping information including a plurality of programming schedule segments each including a corresponding time frame parameter indicative of an associated time frame, and a corresponding channel parameter indicative of an associated one of the channels, each of said schedule segments being associated with a corresponding portion of video data to be received by said system via said corresponding channel during said corresponding time frame, said mapping information also including a plurality of Web addresses associated with corresponding ones of said schedule segments, each of said Web addresses indicating a corresponding Web server operative to provide an information resource associated with said corresponding schedule segment;

a memory unit for storing said mapping information; and a video processing unit coupled for communication with the processor and operative to generate a display signal adapted for displaying matching information associated with said matching information resource and for displaying said corresponding portion of video data carried by said currently selected channel on a television screen.

22. A system as recited in claim 21 wherein said internet module comprises a modem.

23. A system as recited in claim 21 wherein said mapping information further comprises a plurality of user identification parameters indicative of corresponding users of said system, and wherein each of said web addresses associated with said program schedule segments is selected based on a corresponding one of said user identification parameters.

24. A system as recited in claim 21 wherein said video processing unit include logic for displaying said matching information and said corresponding portion of video data on the television screen in a picture in picture mode.

25. A system as recited in claim 21 wherein said video processing unit include logic for displaying said matching information and said corresponding portion of video data on the television screen in a split screen mode.

26. A client system for accessing information resources associated with corresponding segments of video data, the system comprising:

a processor;

a memory unit coupled to said processor;

an internet module coupled for communication with said processor and providing communication with remote sites via the internet;

a television tuner coupled for communication with the processor and being operative to receive a video input signal having a plurality of video channels carrying the video data; and a video processing unit coupled for communication with the processor and being operative to provide a video output signal to a television;

logic for implementing a process comprising the steps of:

accessing a dedicated server Web site via the internet;

determining a selected channel parameter indicative of a selected one of the video channels received by the television tuner of the client system;

determining a particular time parameter indicative of a particular time at the client site, said selected video channel and said particular time being associated with a particular portion of video data to be transmitted to the client system via said selected video channel at said particular time;

transmitting client information to said server, said client information including said selected channel parameter and said particular time parameter, said server being operative to select a matching information resource associated with said particular portion of video data, said matching information resource being determined based on said client system information;

receiving a link to said matching information resource via the internet;

receiving said particular portion of video data carried by said selected video channel via the television tuner; and displaying information associated with said matching information resource and said particular portion of video data on the television.

27. A client system as recited in claim 26 wherein said client information further comprises a user ID parameter indicative of a registered user of the client system.

28. A client system as recited in claim 26 wherein said server is further operative to determine matching layout information based on said client system information, said matching layout information being indicative of a selected one of a plurality of display modes for displaying said matching information on the television, the process further comprising the step of:

receiving said matching layout information from said server;

wherein said step of displaying said matching information and said particular portion of video data on the television includes displaying said matching information in accordance with said selected display mode.

29. A client system as recited in claim 28 wherein said selected display mode is selected from a group consisting of a picture in picture (PIP) display mode and a banner display mode.

30. A client system as recited in claim 26 wherein said matching information resource includes streaming audio and video animation graphics.

31. A client system as recited in claim 26 wherein said server is further operative to provide electronic program schedule information including a plurality of program schedule segments each including a corresponding time frame parameter indicative of an associated time frame, and a corresponding one of said channel parameters, each of said program schedule segments being associated with a corresponding portion of video data to be received by said system via said corresponding channel during said corresponding time frame, the process further comprising the steps of:

downloading the electronic program schedule information from the dedicated server; and storing the program schedule information in the memory unit of the client system.

32. A client system as recited in claim 26 further comprising the step of:

receiving a fill-in form from the server; and providing client personal information to the server via the fill-in form.

33. A client system as recited in claim 26 wherein at least one of said information resources includes information compiled based on a user profile matching a pre-registered user of said system.

* * * * *